United States Patent
Iyer et al.

(10) Patent No.: US 7,929,966 B2
(45) Date of Patent: *Apr. 19, 2011

(54) ACCESS TERMINAL FOR COMMUNICATING PACKETS USING A HOME ANCHORED BEARER PATH OR A VISITED ANCHORED BEARER PATH

(75) Inventors: Jayaraman R. Iyer, Sunnyvale, CA (US); Kent K. Leung, Los Altos, CA (US); Timothy P. Stammers, Raleigh, NC (US); Anand K. Oswal, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 150 days.

This patent is subject to a terminal disclaimer.

(21) Appl. No.: 11/715,041

(22) Filed: Mar. 6, 2007

(65) Prior Publication Data
US 2007/0206557 A1 Sep. 6, 2007

Related U.S. Application Data

(60) Provisional application No. 60/780,176, filed on Mar. 6, 2006.

(51) Int. Cl.
*H04W 4/00* (2009.01)
(52) U.S. Cl. ............ 455/435.2; 709/209; 709/238; 370/328; 370/331; 370/335; 370/342; 370/338; 455/436
(58) Field of Classification Search .......... 455/338, 455/331, 435.2, 436; 370/328, 331, 335, 370/338, 342; 709/209, 238
See application file for complete search history.

(56) References Cited

U.S. PATENT DOCUMENTS

| 5,602,907 A | 2/1997 | Hata et al. ............... 379/114 |
| 5,822,411 A | 10/1998 | Swale et al. ............... 379/111 |
| 5,828,737 A | 10/1998 | Sawyer ............... 379/114 |
| 5,905,736 A | 5/1999 | Ronen et al. ............... 370/546 |
| 5,909,238 A | 6/1999 | Nagashima et al. ............... 348/3 |
| 5,946,670 A | 8/1999 | Motohashi et al. ............... 705/400 |

(Continued)

FOREIGN PATENT DOCUMENTS
WO   WO 98/26381   6/1998

(Continued)

OTHER PUBLICATIONS

Online Inc., "Apogee Releases Content Usage-Based Billing Product Annotated Title—Software allows content usage-based billing," EContent, vol. 24, No. 5, NDN 173-0356-6509-7, 1 pg., Jul. 2001.

(Continued)

*Primary Examiner* — Dwayne D Bost
*Assistant Examiner* — Pierre-Louis Desir
(74) *Attorney, Agent, or Firm* — Baker Botts L.L.P.

(57) ABSTRACT

Communicating packets along a bearer path includes receiving a home network address and a visited network address at an access terminal. The home network address corresponds to a home anchored bearer path anchored at a home network of the access terminal. The visited network address corresponds to a visited anchored bearer path anchored at a visited network. The access terminal determines whether to use the home anchored bearer path or the visited anchored bearer path, and communicates packets using the home network address or the visited network address in accordance with the determination.

17 Claims, 4 Drawing Sheets

U.S. PATENT DOCUMENTS

| | | | |
|---|---|---|---|
| 5,956,391 A | 9/1999 | Melen et al. | 379/114 |
| 5,970,477 A | 10/1999 | Roden | 705/32 |
| 5,987,498 A | 11/1999 | Athing et al. | 709/203 |
| 6,016,509 A | 1/2000 | Dedrick | 709/224 |
| 6,035,281 A | 3/2000 | Crosskey et al. | 705/14 |
| 6,047,051 A | 4/2000 | Ginzboorg et al. | 379/130 |
| 6,070,192 A | 5/2000 | Holt et al. | 709/227 |
| 6,075,854 A | 6/2000 | Copley et al. | 379/211 |
| 6,131,024 A | 10/2000 | Boltz | 455/405 |
| 6,137,791 A | 10/2000 | Frid et al. | 370/352 |
| 6,141,684 A | 10/2000 | McDonald et al. | 709/222 |
| 6,175,879 B1 | 1/2001 | Shah et al. | 709/330 |
| 6,208,977 B1 | 3/2001 | Hernandez et al. | 705/34 |
| 6,229,887 B1 | 5/2001 | Albers et al. | 379/219 |
| 6,282,573 B1 | 8/2001 | Darago et al. | 709/229 |
| 6,295,447 B1 | 9/2001 | Reichelt et al. | 455/417 |
| 6,330,562 B1 | 12/2001 | Boden et al. | 707/10 |
| 6,332,163 B1 | 12/2001 | Bowman-Amauh | 709/231 |
| 6,339,832 B1 | 1/2002 | Bowman-Amauh | 714/35 |
| 6,434,568 B1 | 8/2002 | Bowman-Amauh | 707/103 R |
| 6,434,628 B1 | 8/2002 | Bowman-Amauh | 714/48 |
| 6,438,594 B1 | 8/2002 | Bowman-Amauh | 709/225 |
| 6,442,748 B1 | 8/2002 | Bowman-Amauh | 717/108 |
| 6,466,964 B1 | 10/2002 | Leung et al. | 709/202 |
| 6,477,580 B1 | 11/2002 | Bowman-Amauh | 709/231 |
| 6,477,665 B1 | 11/2002 | Bowman-Amauh | 714/39 |
| 6,480,485 B1 | 11/2002 | Kari et al. | 370/352 |
| 6,490,451 B1 | 12/2002 | Denman et al. | 455/436 |
| 6,493,547 B1 | 12/2002 | Raith | 455/405 |
| 6,496,850 B1 | 12/2002 | Bowman-Amauh | 709/203 |
| 6,502,213 B1 | 12/2002 | Bowman-Amauh | 714/49 |
| 6,510,513 B1 | 1/2003 | Danieli | 713/156 |
| 6,529,909 B1 | 3/2003 | Bowman-Amauh | 707/10 |
| 6,529,948 B1 | 3/2003 | Bowman-Amauh | 709/217 |
| 6,539,396 B1 | 3/2003 | Bowman-Amauh | 707/103 R |
| 6,549,949 B1 | 4/2003 | Bowman-Amauh | 709/236 |
| 6,550,057 B1 | 4/2003 | Bowman-Amauh | 717/126 |
| 6,571,282 B1 | 5/2003 | Bowman-Amauh | 709/219 |
| 6,578,068 B1 | 6/2003 | Bowman-Amauh | 709/203 |
| 6,601,192 B1 | 7/2003 | Bowman-Amauh | 714/38 |
| 6,601,234 B1 | 7/2003 | Bowman-Amauh | 717/108 |
| 6,606,660 B1 | 8/2003 | Bowman-Amauh | 709/227 |
| 6,611,821 B2 | 8/2003 | Stahl et al. | 705/400 |
| 6,615,199 B1 | 9/2003 | Bowman-Amauh | 706/50 |
| 6,615,253 B1 | 9/2003 | Bowman-Amauh | 709/225 |
| 6,615,263 B2 | 9/2003 | Dulai et al. | 709/225 |
| 6,621,820 B1 | 9/2003 | Williams et al. | 370/395.31 |
| 6,636,242 B2 | 10/2003 | Bowman-Amauh | 715/764 |
| 6,640,238 B1 | 10/2003 | Bowman-Amauh | 709/201 |
| 6,640,244 B1 | 10/2003 | Bowman-Amauh | 709/207 |
| 6,647,262 B1 | 11/2003 | Demetrescu et al. | 455/436 |
| 6,665,537 B1 | 12/2003 | Lioy | 455/435 |
| 6,665,718 B1 | 12/2003 | Chuah et al. | 709/225 |
| 6,671,675 B2 | 12/2003 | Iwamura | 705/30 |
| 6,684,243 B1 | 1/2004 | Euget et al. | 709/222 |
| 6,684,256 B1 | 1/2004 | Warrier et al. | 709/238 |
| 6,708,225 B1 | 3/2004 | Cho et al. | 709/317 |
| 6,714,515 B1 | 3/2004 | Marchand | 370/231 |
| 6,715,145 B1 | 3/2004 | Bowman-Amauh | 718/101 |
| 6,728,266 B1 | 4/2004 | Sabry et al. | 370/468 |
| 6,728,365 B1 | 4/2004 | Li et al. | 379/329 |
| 6,728,884 B1 | 4/2004 | Lim | 713/201 |
| 6,742,015 B1 | 5/2004 | Bowman-Amauh | 718/101 |
| 6,742,036 B1 | 5/2004 | Das et al. | 709/226 |
| 6,757,371 B2 | 6/2004 | Kim et al. | 379/114.22 |
| 6,760,444 B1 | 7/2004 | Leung | 380/270 |
| 6,768,726 B2 | 7/2004 | Dorenbosch et al. | 370/331 |
| 6,769,000 B1 | 7/2004 | Akhtar et al. | 707/103 R |
| 6,771,623 B2 | 8/2004 | Ton | 370/331 |
| 6,785,256 B2 | 8/2004 | O'Neill | 370/338 |
| 6,804,518 B2 | 10/2004 | Core et al. | 455/436 |
| 6,826,173 B1 | 11/2004 | Kung et al. | 370/352 |
| 6,829,709 B1 | 12/2004 | Acharya et al. | 713/160 |
| 6,834,341 B1 | 12/2004 | Bahl et al. | 713/156 |
| 6,839,338 B1 | 1/2005 | Amara et al. | 370/338 |
| 6,842,906 B1 | 1/2005 | Bowman-Amauh | 719/330 |
| 6,856,676 B1 | 2/2005 | Pirot et al. | 379/201.01 |
| 6,889,321 B1 | 5/2005 | Kung et al. | 713/153 |
| 6,907,501 B2 | 6/2005 | Tariq et al. | 711/118 |
| 6,910,074 B1 | 6/2005 | Amin et al. | 709/227 |
| 6,915,345 B1 | 7/2005 | Tummala et al. | 709/225 |
| 6,917,605 B2 | 7/2005 | Kakemizu et al. | 370/338 |
| 6,920,503 B1 | 7/2005 | Nanji et al. | 709/230 |
| 6,922,404 B1 | 7/2005 | Narayanan et al. | 370/338 |
| 6,925,160 B1 | 8/2005 | Stevens et al. | 379/121.05 |
| 6,947,401 B2 | 9/2005 | El-Malki et al. | 370/331 |
| 6,961,774 B1 | 11/2005 | Shannon et al. | 709/227 |
| 6,967,941 B2 | 11/2005 | Roy | 370/338 |
| 6,978,128 B1 | 12/2005 | Raman et al. | 455/414 |
| 6,980,802 B2 | 12/2005 | Jung | 455/436 |
| 6,980,962 B1 | 12/2005 | Arganbright et al. | 705/26 |
| 6,981,047 B2 | 12/2005 | Hanson et al. | 709/227 |
| 6,982,967 B1 | 1/2006 | Leung | 370/328 |
| 6,990,337 B2 | 1/2006 | O'Neill et al. | 455/422.1 |
| 6,993,333 B2 | 1/2006 | Laroia et al. | 455/436 |
| 7,003,294 B2 | 2/2006 | Singhai et al. | 455/435.1 |
| 7,020,697 B1 | 3/2006 | Goodman et al. | 709/223 |
| 7,024,687 B2 | 4/2006 | Chaudhuri et al. | 726/3 |
| 7,028,311 B2 | 4/2006 | Roach et al. | 719/328 |
| 7,039,027 B2 | 5/2006 | Bridgelall | 370/329 |
| 7,054,268 B1 | 5/2006 | Parantainen et al. | 370/231 |
| 7,079,499 B1 | 7/2006 | Akhtar et al. | 370/310 |
| 7,082,301 B2 | 7/2006 | Jagadeesan et al. | 455/436 |
| 7,103,359 B1 | 9/2006 | Heinonen et al. | 455/436 |
| 7,127,234 B2 | 10/2006 | Ishii | 455/411 |
| 7,130,286 B2 | 10/2006 | Koodli et al. | 370/331 |
| 7,133,386 B2 | 11/2006 | Holur et al. | 370/331 |
| 7,151,758 B2 | 12/2006 | Kumaki et al. | 370/331 |
| 7,151,772 B1 | 12/2006 | Kalmanek, Jr. et al. | 370/390 |
| 7,154,868 B1 | 12/2006 | Sharma et al. | 370/331 |
| 7,161,914 B2 | 1/2007 | Shoaib et al. | 370/331 |
| 7,171,555 B1 | 1/2007 | Salowey et al. | 713/156 |
| 7,184,418 B1 | 2/2007 | Baba et al. | 370/331 |
| 7,187,931 B2 | 3/2007 | Trossen | 455/440 |
| 7,190,793 B2 | 3/2007 | Hsu | 380/270 |
| 7,197,763 B2 | 3/2007 | Hsu | 726/4 |
| 7,212,821 B2 | 5/2007 | Laroia et | 455/437 |
| 7,230,951 B2 | 6/2007 | Mizell et al. | 370/401 |
| 7,233,583 B2 | 6/2007 | Asthana et al. | 370/332 |
| 7,251,733 B2 | 7/2007 | Haverinen et al. | 713/182 |
| 7,263,371 B2 | 8/2007 | Das et al. | 455/456.1 |
| 7,269,727 B1 | 9/2007 | Mukherjee et al. | 713/160 |
| 7,272,122 B2 | 9/2007 | Trossen et al. | 370/331 |
| 7,272,123 B2 | 9/2007 | Wall | 370/331 |
| 7,275,156 B2 | 9/2007 | Balfanz et al. | 713/168 |
| 7,389,106 B2 | 6/2008 | Dawson et al. | 455/406 |
| 2001/0023428 A1 | 9/2001 | Miyazaki et al. | 709/201 |
| 2002/0021681 A1 | 2/2002 | Madour | 370/331 |
| 2002/0023174 A1 | 2/2002 | Garrett et al. | 709/245 |
| 2002/0036982 A1 | 3/2002 | Chen | 370/230 |
| 2002/0059114 A1 | 5/2002 | Cockrill et al. | 705/27 |
| 2002/0091802 A1 | 7/2002 | Paul et al. | 709/220 |
| 2002/0138601 A1 | 9/2002 | Piponius et al. | 709/223 |
| 2002/0151312 A1 | 10/2002 | Bos et al. | 455/452 |
| 2003/0021252 A1 | 1/2003 | Harper et al. | 370/338 |
| 2003/0039237 A1 | 2/2003 | Forslow | 370/352 |
| 2003/0154400 A1 | 8/2003 | Pirttimaa et al. | 713/201 |
| 2003/0174688 A1* | 9/2003 | Ahmed et al. | 370/349 |
| 2003/0187817 A1 | 10/2003 | Agrawal et al. | 707/1 |
| 2003/0217165 A1 | 11/2003 | Buch et al. | 709/229 |
| 2004/0034695 A1* | 2/2004 | Touch et al. | 709/209 |
| 2004/0114553 A1 | 6/2004 | Jiang et al. | 370/328 |
| 2004/0162876 A1 | 8/2004 | Kohavi | 709/203 |
| 2004/0162892 A1* | 8/2004 | Hsu | 709/221 |
| 2004/0196821 A1 | 10/2004 | Haddad et al. | 370/349 |
| 2004/0210524 A1 | 10/2004 | Benenati et al. | 705/40 |
| 2004/0259562 A1 | 12/2004 | Madour | 455/452.2 |
| 2005/0002407 A1 | 1/2005 | Shaheen et al. | 370/401 |
| 2005/0025132 A1 | 2/2005 | Harper et al. | 370/352 |
| 2005/0102421 A1 | 5/2005 | Horvath et al. | |
| 2005/0130659 A1 | 6/2005 | Grech et al. | 455/436 |
| 2005/0149651 A1 | 7/2005 | Doak et al. | 710/52 |
| 2005/0176428 A1 | 8/2005 | Gabor et al. | 455/435.1 |
| 2005/0188093 A1 | 8/2005 | Haddad | |
| 2005/0195766 A1* | 9/2005 | Nasielski et al. | 370/331 |
| 2005/0201324 A1 | 9/2005 | Zheng | 370/328 |
| 2005/0213606 A1 | 9/2005 | Huang et al. | 370/467 |

| | | | |
|---|---|---|---|
| 2005/0220039 A1 | 10/2005 | Hoshino et al. | 370/261 |
| 2005/0259631 A1 | 11/2005 | Rajahalme | 370/351 |
| 2005/0265278 A1* | 12/2005 | Hsu et al. | 370/328 |
| 2005/0278420 A1 | 12/2005 | Hartikainen et al. | 709/203 |
| 2005/0286709 A1 | 12/2005 | Horton et al. | 379/265.09 |
| 2006/0014547 A1 | 1/2006 | Walter | 455/456.1 |
| 2006/0018272 A1 | 1/2006 | Mutikainen et al. | 370/328 |
| 2006/0077924 A1 | 4/2006 | Rune | 370/328 |
| 2006/0116113 A1 | 6/2006 | Gass | 455/414.4 |
| 2006/0126630 A1 | 6/2006 | Shirazipour et al. | 370/392 |
| 2006/0140177 A1 | 6/2006 | Karhu | 370/356 |
| 2006/0141995 A1 | 6/2006 | Purnadi et al. | 455/414.1 |
| 2006/0171310 A1 | 8/2006 | Ahluwalia et al. | 370/229 |
| 2006/0251038 A1 | 11/2006 | Tamura et al. | 370/342 |
| 2006/0264207 A1 | 11/2006 | Tamura et al. | 455/415 |
| 2006/0268819 A1 | 11/2006 | Chen et al. | 370/349 |
| 2007/0008882 A1 | 1/2007 | Oran | 370/229 |
| 2007/0036312 A1 | 2/2007 | Cai et al. | 379/126 |
| 2007/0086582 A1 | 4/2007 | Tai et al. | 379/114.01 |
| 2007/0094712 A1 | 4/2007 | Gibbs et al. | 726/3 |
| 2007/0121615 A1 | 5/2007 | Weill et al. | 370/389 |
| 2007/0121642 A1 | 5/2007 | Battin et al. | 370/395.2 |
| 2007/0153720 A1 | 7/2007 | Baglin et al. | 370/328 |
| 2007/0254661 A1 | 11/2007 | Chowdhury | 455/436 |

FOREIGN PATENT DOCUMENTS

| | | |
|---|---|---|
| WO | WO 99/31610 | 6/1999 |
| WO | WO 2005/107297 | 11/2005 |

OTHER PUBLICATIONS

Centaur Communications, "Secret Bear platform allows paid-for SMS Annotated Title—Secret Bear introduced cross-network reverse billing platform allowing content providers to charge for SMS content," New Media Age, NDN 173-0354-6130-3, 1 pg., Jun. 28, 2001.
Karsten Luttge, "E-Charging API: Outsource Charging to a Payment Service Provider," NDN 174-0708-0924-8, pp. 216-227, 2001.
A. Herzberg, "Safeguarding Digital Library Contents: Charging for Online Content," D-Lib Magazine, NDN 174-0590-9051-8, 16 pgs., Jan. 1998.
Business Wire, "Apogee Networks Introduces Industry's First Content Usage-Based Billing Solution for Web Hosters," NDN 219-0281-6988-1, 2 pgs., May 8, 2001.
Business Wire, "Apogee Networks Announces Investment by Cisco Systems; Combined Efforts Enhance Billing Capabilities for Content Delivery Network Providers," NDN 219-0220-9035-0, 2 pgs., Jan. 23, 2001.
Business Wire, "Key Analysts Predict Content Billing is the Internet's New Frontier; Content is the Asset of the Industry; Apogee Networks Seen as the Leader in New Internet Industry Space," NDN 219-0162-6934-6, 3 pgs., Oct. 10, 2000.
Business Wire, "Apogee Networks Unveils NetCountant Wireless Billing At SUPERCOMM; Company Demonstrates Industry First Wireless Content Usage Based Billing Solution," NDN 218-0324-8075-6, 2 pgs., Jun. 5, 2001.
Business Wire, "Apogee Networks Wins 2000 Communications ASP Product of the Year Award; Apogee Networks' NetCountant Billing Takes Top Honors for Innovative Content Usage Based Billing Solutions," NDN 218-0282-3757-7, 2 pgs., Mar. 21, 2001.
Business Wire, "Wireless Internet Content Billing and Settlement Capability Announced; Companies Announce Interoperability Between WAP Gateway and Content Billing System," NDN 218-0220-0997-2, 2 pgs., Dec. 6, 2000.
Business Wire, "Apogee Networks Joins Content Alliance; Billing Expert to Join Industry Group Aimed At Advancing Content Networking," NDN 218-0181-2716-7, 3 pgs., Oct. 11, 2000.
Business Wire, "Apogee Networks, Inc. and Paysys International, Inc. to Integrate Technologies to Create Advanced IP Content Billing Solutions," NDN 218-0098-0623-9, 3 pgs., Jun. 19, 2000.
Ylitalo, et al., *Re-thinking Security in IP based Micro-Mobility*, downloaded from www.tcs.hut.fi/Studies/T-79.5401/2005AUT/ISCO4-Vlitalo-e-al.pdf (12 pages).
Draft—TR45—PN-3-4732-RV4 (to be published as TIA-835.1-D), 32 pages.
Draft—TR45—PN-3-4732-RV4 (to be published as TIA-835.2-D), 93 pages.
Draft—TR45—PN-3-4732-RV4 (to be published as TIA-835.3-D), 36 pages.
Draft—TR45—PN-3-4732-RV4 (to be published as TIA-835.4-D), 70 pages.
Draft—TR45—PN-3-4732-RV4 (to be published as TIA-835.5-D), 72 pages.
Draft—TR45—PN-3-4732-RV4 (to be published as TIA-835.6-D), 36 pages.
3GPP2 C.S0067, 3rd Generation Partnership Project 2 '3GPP2', "Generic Key Exchange Protocol for cdma2000 High Rate Packet Data Air Interface," Version 1.0, 24 pages, Nov. 2005.
3GPP2 X.S0011-001-D, 3rd Generation Partnership Project 2 '3GPP2', "cdma2000 Wireless IP Network Standard: Introduction," Version 1.0, 33 pages, Feb. 2006.
3GPP2 C.S0063-0, 3rd Generation Partnership Project 2 '3GPP2', "cdma2000 High Rate Packet Data Supplemental," Version 1.0, 127 pages, Mar. 2006.
3GPP2 A.S0008-A v.1.0, 3rd Generation Partnership Project 2 '3GPP2,' Interoperability Specification (IOS) for High Rate Packet Data (HRPD) Radio Access Network Interfaces with Session Control in the Access Network, 257 pages, Mar. 2006.
3GPP2 C.S0024-A, 3rd Generation Partnership Project 2 '3GPP2', "cdma2000 High Rate Packet Data Air Interface Specification," Version 2.0, 1,223 pages, Jul. 2005.
B. Aboba, et al., "Extensible Authentication Protocol (EAP)," Network Working Group, RFC 3748, http://www.ietf.org/rfc/rfc3748.txt, 59 pages, Jun. 2004.
B. Aboba, D. Simon, "PPP EAP TLS Authentication Protocol," Network Working Group, RFC 2716, http://www.ietf.org/rfc/rfc2716.txt, 22 pages, Oct. 1999.
W. Simpson, "PPP Challenge Handshake Authentication Protocol (CHAP)," Network Working Group, RFC 1994, http://www.ietf.org/rfc/rfc1994.txt, 12 pages, Aug. 1996.
W. Simpson, "The Point-to-Point (PPP)," Network Working Group, RFC 1661, http://www.ietf.org/rfc/rfc1661.txt, 47 pages, Jul. 1994.
P. Eronen, et al., "Diameter Extensible Authentication Protocol (EAP) Application," Network Working Group, RFC 4072, http://www.ietf.org/rfc/rfc4072.txt, 29 pages, Aug. 2005.
P. Calhoun, et al., "Diameter Base Protocol," Network Working Group, RFC 3588, http://www.ietf.org/rfc/rfc3588.txt, 129 pages, Sep. 2003.
3rd Generation Partnership Project 2 "3GPP2"; "All-IP Core Network Multimedia Domain: Service Based Bearer Control- Stage 2;www.3gpp2.org-"; Version 1.0. Draft Version 0.21.0, 49 pages.
PCT Notification of Transmittal of the International Search Report and the Written Opinion of the International Searching Authority, or the Declaration, International Application No. PCT/US07/05847, 9 pages, Oct. 26, 2007.
PCT Notification of Transmittal of the International Search Report and the Written Opinion of the International Searching Authority, or the Declaration, International Application No. PCT/US07/05849, 9 pages, Nov. 14, 2007.
Yegani et al., "System and Method for Access Authentication in a Mobile Wireless Network," U.S. Appl. No. 11/419,382, 20 pps, 3 pps drawings (2104), filed May 19, 2006.
Yegani et al., "System and Method for Handover of an Access Terminal in a Communication Network," U.S. Appl. No. 11/682,735, 24 pps, 3 pps drawings (2360), filed Mar. 6, 2007.
Yegani et al., "Enforcement of User Level Policies from Visited Networks in a Mobile IP Environment," U.S. Appl. No. 11/682,817, 22 pps, 2 pps drawings (2359), filed Mar. 6, 2007.
Yegani et al, Authentication of Access Terminals in a Cellular Communication Network,: U.S. Appl. No. 11/682,857, 28 pps, 5 pps drawings (2358), filed Mar. 6, 2007.
Andreasen et al., "System and Method of Consolidating Accounting Data for a Communication Session," U.S. Appl. No. 11/714,974, 40 pps, 3 pps drawings (2404), filed Mar. 6, 2007.
Panda et al., "System and Method for Capturing Accounting Data for a Communication Session," U.S. Appl. No. 11/715,018 (2402), filed Mar. 6, 2007.

Rosenberg et al., "System and Method for Determining a Network for Processing Applications for a Communication Session," U.S. Appl. No. 11/715,019, 40 pps, 3 pps drawings (2406), filed Mar. 6, 2007.

Rosenberg et al., "Determining a Policy Output for a Communication Session," U.S. Appl. No. 11/715,032, 31 pps, 4 pps drawings (2368), filed Mar. 6, 2007.

Leung et al., "Communicating Packets Using a Home Anchored Bearer Path," U.S. Appl. No. 11/715,033, 33 pps, 4 pps drawings (2407), filed Mar. 6, 2007.

Andreasen et al., "Posture-Based Network Authentication," U.S. Appl. No. 11/715,040, 23 pages, 2 pps drawings (2398), filed Mar. 6, 2007.

Rosenberg et al., "System and Method for Exchanging Policy Information in a Roaming Communications Environment," U.S. Appl. No. 11/715,056, 42 pps, 3 pps drawings (2416), filed Mar. 6, 2007.

Rosenberg et al., "Establishing Facets of a Policy for a Communication Session," U.S. Appl. No. 11/715,065, 32 pps, 4 pps drawings (2409), filed Mar. 6, 2007.

Rosenberg et al., "Performing Deep Packet Inspection for a Communication Session," U.S. Appl. No. 11/715,073, 31 pps, 4 pps drawings (2400), filed Mar. 6, 2007.

Rosenberg et al., "Assigning a Serving- CSCF During Access Authentication," U.S. Appl. No. 11/715,074, 22 pps, 2 pps drawings, (2410), filed Mar. 6, 2007.

Rosenberg et al., "System and Method for Providing Emergency Services in a Visited Communications Environment," U.S. Appl. No. 11/715,111, 39 pps, 2 pps drawings (2418), filed Mar. 6, 2007.

Panda et al., "Application-Aware Policy Enforcement," U.S. Appl. No. 11/715,187, 28 pps, 2 pps drawings (2403), filed Mar. 6, 2007.

Andreasen et al., "System and Method for Generating a Unified Accounting Record for a Communication Session," U.S. Appl. No. 11/715,210, 46 pps, 3 pps drawings (2399), filed Mar. 6, 2007.

Andreasen et al., "Network-triggered quality of service (QoS) Reservation," U.S. Appl. No. 11/715,250, 21 pps, 2 pps drawings (2405), filed Mar. 6, 2007.

Andreasen et al.,; "Policy-Based Control of Content Intercept", U.S. Appl. No. 11/715,251, 23 pps, 2 pps drawings (2401).

Rosenberg et al., "System and Method for Network Charging Using Policy Peering," U.S. Appl. No. 11/715,256, 43 pps, 3 pps drawings (2415), filed Mar. 6, 2007.

PCT Notification of Transmittal of the International Search Report and the Written Opinion of the International Searching Authority, or the Declaration with attached PCT International Search Report and Written Opinion of the International Searching Authority in International Application No. PCT/US 07/05937, dated Oct. 25, 2007, 6 pages.

*USPTO*, Office Action dated Feb. 4, 2009 for U.S. Appl. No. 11/715,033 in the name of Kent K. Leung, 18 pages.

PCT Notification of Transmittal of the International Search Report and the Written Opinion of the International Searching Authority, or the Declaration with attached PCT International Search Report and Written Opinion of the International Searching Authority in International Application No. PCT/US2006/046800, dated Nov. 10, 2008, 10 pages.

USPTO Office Action, U.S. Appl. No. 11/715,033, filed Mar. 6, 2007, inventor Leung, 13 pages, Aug. 18, 2009.

*USPTO*, Office Action dated Jan. 27, 2010 for U.S. Appl. No. 11/715,033 in the name of Kent K. Leung, 13 pages.

* cited by examiner

ACCESS TERMINAL FOR COMMUNICATING PACKETS USING A HOME ANCHORED BEARER PATH OR A VISITED ANCHORED BEARER PATH

RELATED APPLICATION

This application claims priority under 35 U.S.C. §119(e) of U.S. Provisional Application Ser. No. 60/780,176, entitled "VERIZON WIRELESS MULTI-MEDIA PLUS (MMD+) PROGRAM SYSTEM ARCHITECTURE DOCUMENT,", filed Mar. 6, 2006, by Flemming Andreasen et al., which is incorporated herein by reference.

TECHNICAL FIELD

This invention relates generally to the field of telecommunications and more specifically to an access terminal for communicating packets using a home anchored bearer path or a visited anchored bearer path.

BACKGROUND

An endpoint, such as an access terminal, may use a system of communication networks to communicate packets with other endpoints. For example, an access terminal may subscribe to a home network that maintains subscription information for the access terminal. If the access terminal is outside of the serving area of the home network, the access terminal may use a visited network to communicate packets.

Certain known techniques may be used to route packets between endpoints and through networks. These known techniques, however, are not efficient in certain situations. In certain situations, it is generally desirable to be efficient.

SUMMARY OF THE DISCLOSURE

In accordance with the present invention, disadvantages and problems associated with previous techniques for communicating packets may be reduced or eliminated.

According to one embodiment of the present invention, communicating packets along a bearer path includes receiving a home network address and a visited network address at an access terminal. The home network address corresponds to a home anchored bearer path anchored at a home network of the access terminal. The visited network address corresponds to a visited anchored bearer path anchored at a visited network. The access terminal determines whether to use the home anchored bearer path or the visited anchored bearer path, and communicates packets using the home network address or the visited network address in accordance with the determination.

Certain embodiments of the invention may provide one or more technical advantages. A technical advantage of one embodiment may be that packets from an access terminal can be communicated along a home anchored path or a visited anchored path. The home anchored path includes a home bearer manager of a home network and may include a visited bearer manager of a visited network. The visited anchored path includes the visited bearer manager, but not the home bearer manager.

Another technical advantage of one embodiment may be that the access terminal can be provided with a home network address and a visited network address. The home network address may be used to communicate packets along the home anchored path, and the visited network address may be used to communicate packets along the visited anchored path.

Another technical advantage of one embodiment may be that a home policy server of the home network may provide policy rules to a visited policy server of the visited network. The policy rules may be used to enforce policies for packets sent along the visited anchored path.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Embodiments of the present invention and its advantages are best understood by referring to FIGS. 1 through 5 of the drawings, like numerals being used for like and corresponding parts of the various drawings.

Figure 1:
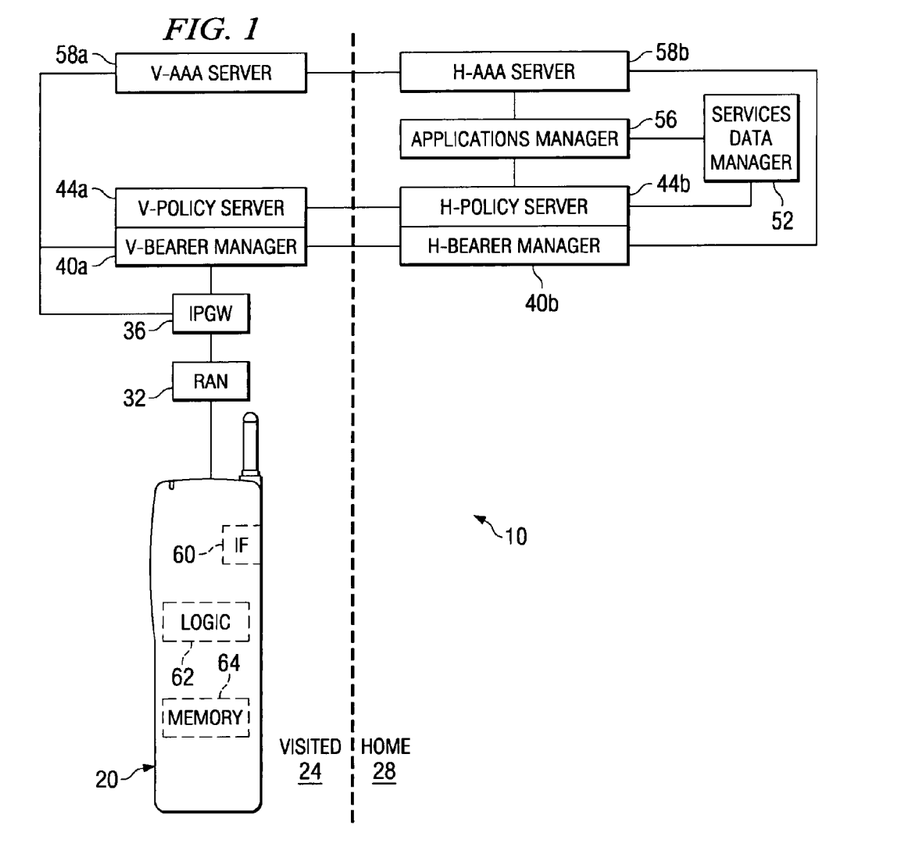
FIG. 1 illustrates one embodiment of a system that communicates packets for an access terminal.

FIG. 1 illustrates one embodiment of a system 10 that communicates packets for an access terminal 20. According to the embodiment, packets from access terminal 20 can be communicated along a home anchored path or a visited anchored path. The home anchored path includes a home bearer manager 40b of a home network 28 of access terminal 20 and a visited bearer manager 40a of a visited network 24. The visited anchored path includes visited bearer manager 40a, but not home bearer manager 40b. In the embodiment, access terminal 20 can be provided with a home network address (H-NA) and a visited network address (V-NA). The home network address may be used to communicate packets along the home anchored path, and the visited network address may be used to communicate packets along the visited anchored path.

According to the illustrated embodiment, system 10 provides services such as communication sessions to endpoints such as access terminal 20. A communication session refers to an active communication between endpoints. Information may be communicated during a communication session. Information may refer to voice, data, text, audio, video, multimedia, control, signaling, other information, or any combination of any of the preceding. Information may be communicated in packets. A packet may comprise a bundle of data organized in a specific way for transmission.

System 10 may utilize communication protocols and technologies to provide the communication sessions. Examples of communication protocols and technologies include those set by the Institute of Electrical and Electronics Engineers, Inc. (IEEE) 822.xx standards, the International Telecommunications Union (ITU-T) standards, the European Telecommunications Standards Institute (ETSI) standards (for example, General Packet Radio Services (GPRS)), the Internet Engineering Task Force (IETF) standards (for example, IP such as mobile IP), or other standards.

According to the illustrated embodiment, system 10 includes access terminals 20. Access terminal 20 represents any suitable device operable to communicate with a communication network. Access terminal 20 may comprise, for example, a personal digital assistant, a computer such as a laptop, a cellular telephone, a mobile handset, or any other device operable to communicate with system 10. Access terminal 20 may support any suitable protocol, for example, simple IP and/or mobile IP.

System 10 also includes communication networks such as a visited network 24 and a home network 28. In general, a communication network may comprise at least a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

In the illustrated embodiment, visited network 24 represents a communication network that facilitates a communication session for access terminal 20 within the serving area of visited network 24. Home network 28 represents a communication network that maintains a subscription for access terminal 20. The subscription may include an account that is charged based upon usage by access terminal 20. Visited network 24 and home network 28 may be part of the same or different communication networks.

Visited network 24 and home network 28 may include any suitable components for facilitating a communication session for access terminal 20. According to the illustrated embodiment, visited network 24 includes a radio access network (RAN) 32, an IP gateway 36, a visited bearer manager (V-BM) 40a, a visited policy server (V-PS) 44a, a visited authentication, authorization, and accounting (AAA) server (V-AAA) 58a. Home network 28 includes a home bearer manager (H-BM) 40b, a home policy server (H-PS) 44b, a services data manager (SDM) 52, an applications manager (AM) 56, and a home AAA server (H-AAA) 58b coupled as shown.

Radio access network 32 provides access services to access terminal 20. For example, radio access network 32 may provide layer 2 mobile access, mobility, and/or handoff services within its area of coverage.

IP gateway 36 operates as a gateway between radio access network 32 and an IP network. IP gateway 36 may perform operations such as authenticating access terminal 20, assigning a bearer manager 40 to access terminal 20, performing handoff functions between two IP gateways 36 or IP gateway 36 and radio access network 32, and/or facilitating registration of access terminal 20 to the IP network. In one embodiment, IP gateway 36 may comprise a packet data serving node (PDSN).

Bearer managers 40 allocate resources and provide bearer paths that communicate packets to and/or from access terminal 20. According to one embodiment, a bearer manager 40 operates as an anchor for a bearer path. Bearer manager 40 may also operate as a home or foreign agent that authorizes use of a network address that allows access terminal 20 to use the bearer path anchored by bearer manager 40.

In the illustrated embodiment, visited bearer manager 40a of visited network 24 provides services to access terminal 20 in visited network 24. According to one embodiment, a visited bearer manager 40a operates as an anchor for a visited anchored path. In the embodiment, visited bearer manager 40a provides a visited network address that allows access terminal 20 to use the visited anchored path. An example of a visited network address includes a visited IP (V-IP) address.

In the illustrated embodiment, home bearer manager 40b of home network 28 provides services to access terminal 20. According to one embodiment, home bearer manager 40b operates as an anchor for a home anchored path. In the embodiment, home bearer manager 40b provides a home network address that allows access terminal 20 to use the home anchored path. An example of a home network address includes a home IP (H-IP) address. The visited home anchored paths are described in more detail with reference to FIG. 2.

Figure 2:
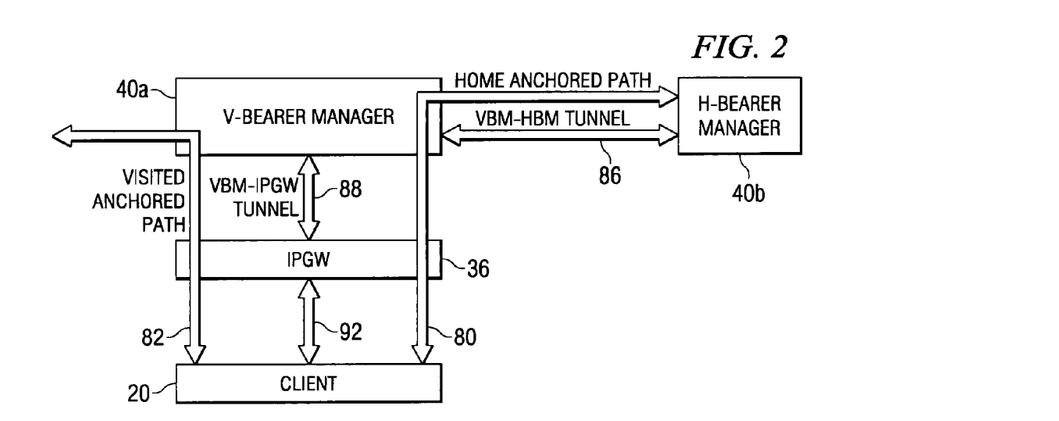
FIG. 2 illustrates examples of bearer paths of the system of FIG. 1.

FIG. 2 illustrates examples of bearer paths of system 10 of FIG. 1. The bearer paths include a home anchored path 80 and a visited anchored path 82. Home anchored path 80 is anchored at home bearer manager 40b and passes through visited bearer manager 40a. Home anchored path 80 may allow visited bearer manager 40a to perform operations for packets on path 80, for example, enforce packet policies, account for the packets, and/or perform other operations. The home network address allows access terminal 20 to use home anchored path 80. Packets that have the visited network address as a care-of address for the home network address may be routed along path 80.

Visited anchored path 82 is anchored at visited bearer manager 40a, and does not pass through home bearer manager 40b. Accordingly, visited anchored path 82 may have a latency that is lower than home anchored path 80. The visited network address allows access terminal 20 to use visited anchored path 82.

Paths 82 and 80 may be utilized in any suitable manner. For example, visited anchored path 82 may be used for situations with stricter latency requirements, but home anchored path 80 may be used for situations that require a more stable path. Home anchored path 80 also enables home network 28 to provide home network specific functions and services that are not supported by visited network 24. In certain cases, both paths 82 and 80 may be used. For example, home anchored path 80 may be used for signaling, and visited anchored path 82 may be used for media. In one embodiment, home anchored path 80 may be the default path.

HBM-VBM tunnel 86 represents a bi-directional tunnel between home bearer manager 40b and visited bearer manager 40a. VBM-IPGW tunnel 88 represents a bi-directional tunnel between visited bearer manager 40a and IP gateway 36. VBM-IPGW tunnel 88 may allow visited bearer manager 40a to forward traffic to access terminal 20 via IP gateway 36, and may comprise, for example, a proxy mobile IP (PMIP) tunnel. Link 92 represents a communication link between IP gateway 36 and access terminal 20. Link 92 may comprise, for example, a point-to-point (PPP), A.10, or A.11 link.

Referring back to FIG. 1, network addresses may be communicated to access terminal 20 in any suitable manner. As an example, a network address may be communicated using the Dynamic Host Configuration Protocol (DHCP). As another example, network address may be communicated using the Point-to-Point Protocol (PPP).

Bearer managers 40 may perform other suitable operations to provide services to access terminal 20. Examples of other suitable operations include processing signaling, committing resources, and maintaining gateways for access terminal 20. Other examples include enforcing network policies (such as mobility policies), providing security, detecting application layer traffic, recording network presence, and/or performing other suitable operation.

A bearer manager 40 may comprise any suitable device, for example, a Serving General Packet Radio Services (GPRS) Support Node (SGSN), a GPRS Gateway Support Node (GGSN), a home/foreign agent, a mobile gateway, a mobile IPv6 node, or a Packet Data Serving Node (PDSN). A bearer manager 40 may use any suitable protocol, for example, an IP Multimedia Subsystem (IMS) protocol.

Policy servers 44 manage policy rules and provide the policy rules to bearer managers 40. In the illustrated embodiment, policy server 44*a* provides policy rules to bearer manager 40*a*. Policy server 44*b* provides policy rules to bearer manager 40*b*, and may also provide policy rules to policy server 44*a*.

In one embodiment, a policy may include rules that specify an action to be taken in particular situations. Policies may include routing rules and other suitable rules such as charging, quality of service, usage tracking, and/or other rules. A routing rule may specify how to route a packet. For example, a routing rule may specify situations in which visited anchored path 82 or home anchored path 80 is to be used. For example, a rule may specify that if packet has a particular source and/or destination, then the packet to be routed along visited anchored path 82. Otherwise, the packet is to be routed along home anchored path 80. In one embodiment, a routing rule that allows the visited network address may be installed for a specific duration, and then revoked.

According to one embodiment, a routing rule may specify that home anchored path 80 is used for certain applications and visited anchored path 82 is used for other applications. For example, home anchored path 80 is used for signaling (such as session initiation protocol (SIP) signaling) and visited anchored path 82 is used for media (such as voice over IP (VoIP)).

Any suitable routing rule may be used. As an example, a routing rule may specify that if access terminals 20 engaged in a real-time communication session are being serviced by the same visited network 24, then use visited anchored path 82. As another example, a routing rule may specify that if there is not an appropriate relationship between visited network 24 and home network 28, then use home anchored path 80. As another example, a routing rule may specify that if high security that can only be provided by home network 28 is required, then use home anchored path 80.

In one embodiment, routing rules may used to provide instructions to access terminal 20 on when to use home anchored path 80 or visited anchored path 82. The instructions may be provided in any suitable manner. For example, the routing rule may be forwarded to access terminal 20. In the example, access terminal 20 may receive a URL to download the routing rules. As another example, access terminal 20 may be configured with the routing rule. As another example, visited bearer manager 40*a* may obtain the routing rule and may instruct access terminal 20 in accordance with the routing rule.

Services data manager (SDM) 52 stores subscriber data for access terminals 20. According to one embodiment, services data manager 52 may store policy documents that define policies. One or more subscribers may be associated with a particular policy document that defines the policies for those subscribers.

Application manager 56 manages applications, such as SIP applications and/or other suitable applications. The applications may be used to perform SIP operations (such as SIP registration, authorization, and routing), voice features (such as call routing and call forwarding), services (such as push-to-talk (PTT) and IP Centrex), Service Capabilities Interaction Management (SCIM), user presence services, and/or other operations. A non-SIP application manager may be used to perform non-SIP operations, such as real-time streaming media using Real Time Streaming Protocol (RTSP), gaming applications using proprietary protocols, and/or other operations. Application manager 56 may communicate with policy server 44 to request a policy to be implemented on its behalf for a particular access terminal 20.

AAA servers 58 perform authentication, authorization, and/or accounting operations. Home AAA server 58*b* performs these operations for access terminal 20. Visited AAA server 58*a* requests that home AAA server 58*b* performs these operations for access terminal 20 served by visited network 24.

A component of system 10 may include any suitable arrangement of elements, for example, an interface, logic, memory, other suitable element, or combination of any of the preceding. For example, access terminal 20 includes an interface 60, logic 62, and a memory 64. An interface receives input, sends output, processes the input and/or output, performs other suitable operation, or performs a combination of any of the preceding. An interface may comprise hardware and/or software.

Logic performs the operations of the component, for example, executes instructions to generate output from input. Logic may include hardware, software, other logic, or combination of any of the preceding. Certain logic, such as a processor, may manage the operation of a component. Examples of a processor include one or more computers, one or more microprocessors, one or more applications, other logic, or a combination of any of the preceding.

A memory stores information. A memory may comprise computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), other computer-readable medium, or a combination of any of the preceding.

Modifications, additions, or omissions may be made to system 10 without departing from the scope of the invention. The components of system 10 may be integrated or separated according to particular needs. Moreover, the operations of system 10 may be performed by more, fewer, or other modules. Additionally, operations of system 10 may be performed using any suitable logic. As used in this document, "each" refers to each member of a set or each member of a subset of a set.

Figure 3:
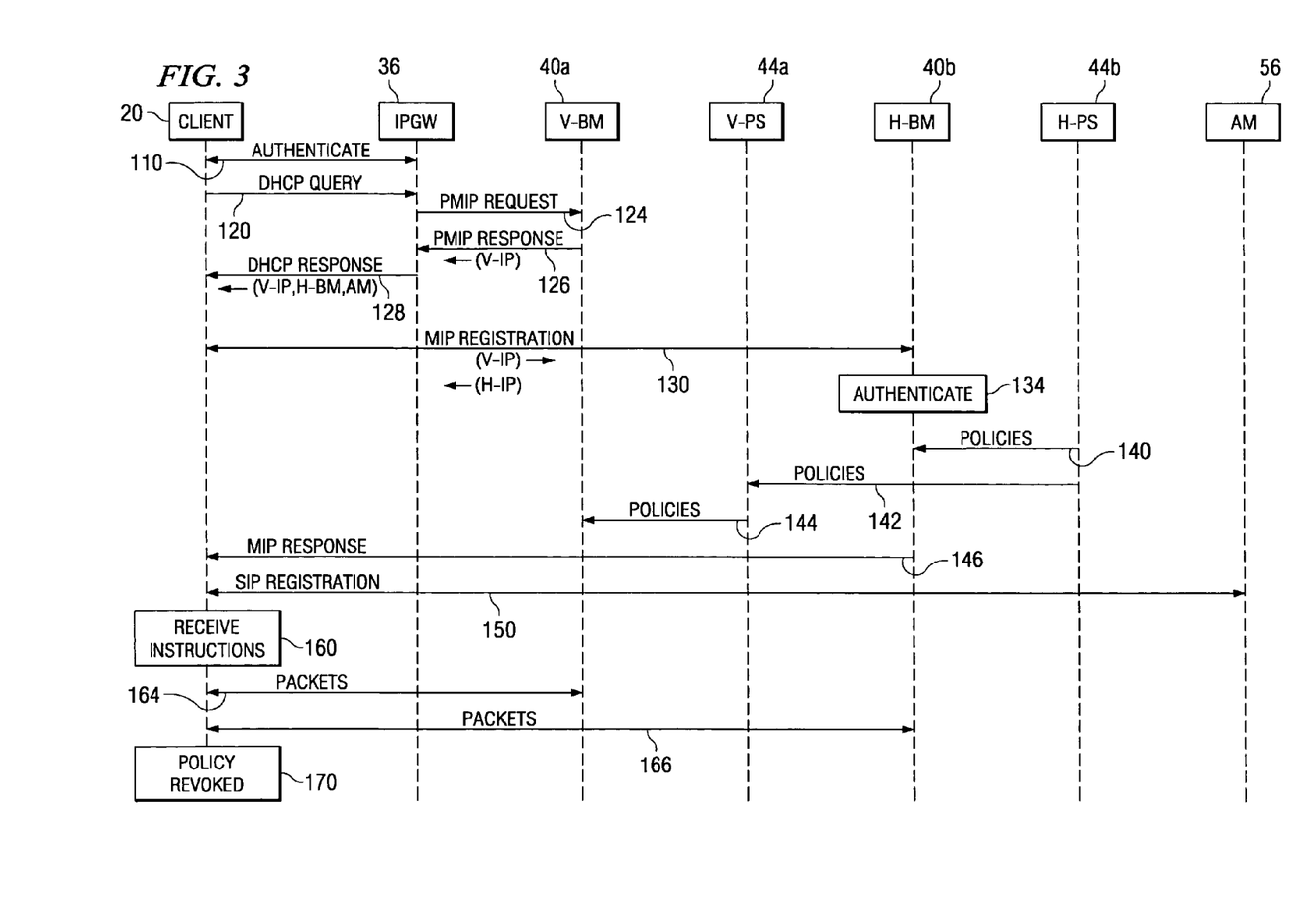
FIG. 3 illustrates one embodiment of a method for sending packets using either a home network address or a visited network address.

FIG. 3 illustrates one embodiment of a method for sending packets using either a home network address or a visited network address. The method may be used by system 10 of FIG. 1.

IP gateway 36 authenticates access terminal 20 at step 110. Access terminal 20 may be authenticated using any suitable protocol, for example, extensible authentication protocol (EAP). Authentication may provide gateway 36 with addresses of home bearer manager 40*b* and applications manager 56 of access terminal 20.

Access terminal 20 obtains a visited network address at steps 120 through 128. The visited network address may be obtained using any suitable protocol, for example, DHCP and a proxy mobile IP (PMIP). Access terminal 20 sends a DHCP query to IP gateway 36 at step 120. IP gateway 36 obtains the visited network address from visited bearer manager 40*a* at steps 124 through 126. Gateway 36 sends a proxy mobile IP request to visited bearer manager 40a at step 124. Visited bearer manager 40a sends a visited network address to IP gateway 36 in a proxy mobile IP response at step 126. IP gateway 36 sends the visited network address to access terminal 20 in a DHCP response at step 128. The DHCP response may also include addresses for home bearer manager 40b and applications manager (AM) 56.

Access terminal 20 obtains a home network address at steps 130 through 150. Access terminal 20 registers with home bearer manager 40b at step 130 according to mobile IP registration. During registration, home bearer manager 40b provides access terminal 20 with a home network address. Also, access terminal 20 notifies home bearer manager 40b of the visited network address as a point-of-attachment in order to include visited bearer manager 40a in home anchored path 80. Home bearer manager 40b authenticates the mobile IP registration at step 134. The authentication may be based on keys derived from the EAP authentication or from shared secret information provisioned for mobile IP authentication.

Home bearer manager 40b obtains policies from home policy server 44b at step 140. Home policy server 44b sends policies to visited policy server 44a at step 142. Visited bearer manager 40a obtains policies from visited policy server 44b at step 144. Home bearer manager 40b sends an mobile IP response to access terminal 20 at step 146. Access terminal 20 performs SIP registration with applications manager 56 at step 150.

Access terminal 20 receives instructions regarding the use of the visited and/or home network addresses at step 160. Access terminal 20 communicates packets using bearer paths 82 and/or 80 according to the policy at steps 164 and 166. Packets may be communicated along bearer path 182 at step 164 using visited network address, and/or packets may be communicated along bearer path 180 using home network address at step 166. Access terminal 20 communicates the packets according to the policy until the policy is revoked at step 170. After the policy is revoked, the method terminates.

Modifications, additions, or omissions may be made to the method without departing from the scope of the invention. The method may include more, fewer, or other steps. Additionally, steps may be performed in any suitable order.

Figure 4:
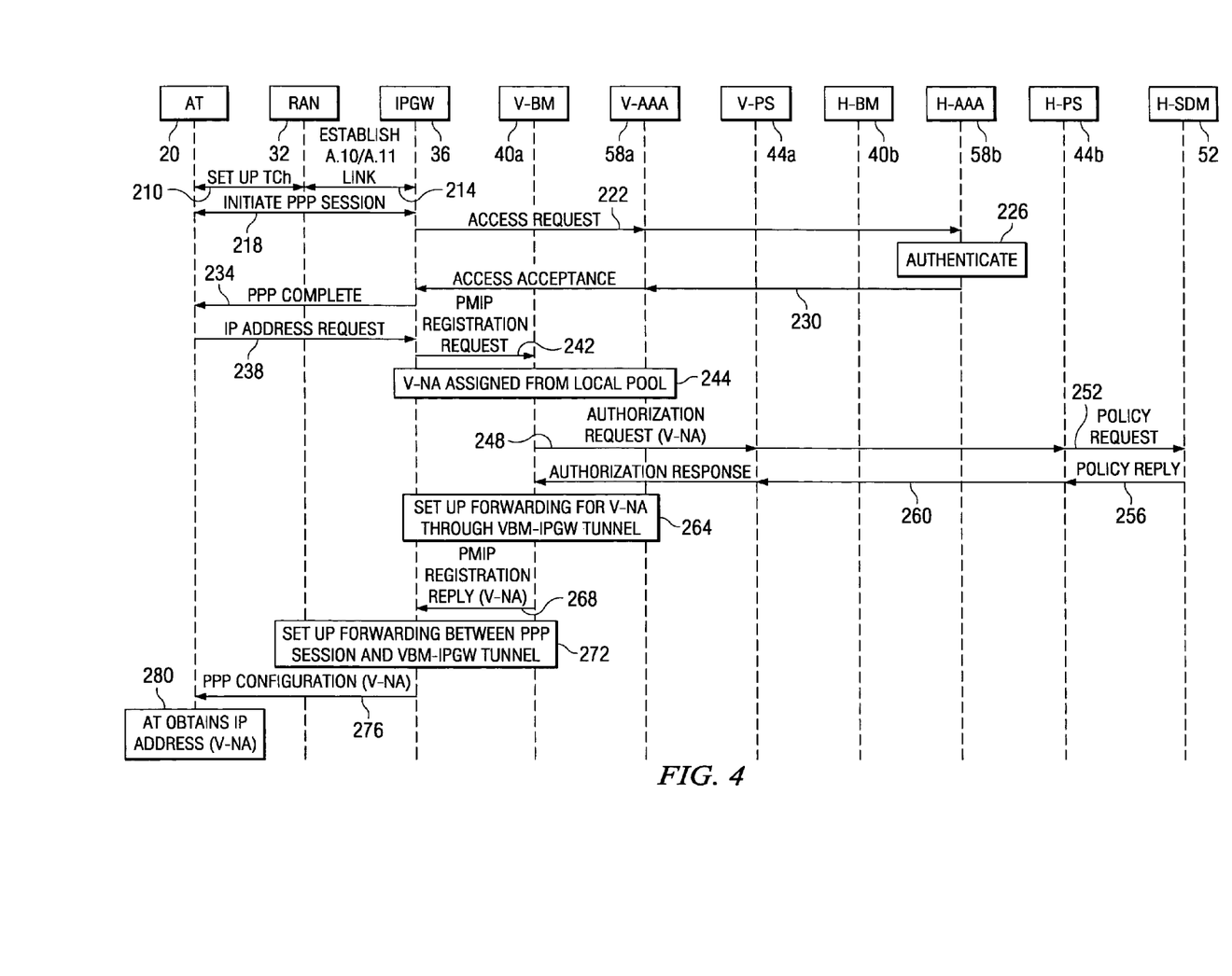
FIG. 4 illustrates one embodiment of a method for establishing a point-to-point session that may be used by the system of FIG. 1.

FIG. 4 illustrates one embodiment of a method for establishing a point-to-point session that may be used by system 10 of FIG. 1. The method begins at step 210, where a traffic channel (TCh) is set up to authenticate access terminal 20. The traffic channel may be set up as access terminal 20 powers up. Access terminal 20 may be provisioned with a network access identifier (NAI), a mobile node-authentication, authorization, and accounting (MN-AAA) security association, and a mobile node-home agent (MN-HA) security association. Radio access network 32 initiates establishment of A.10/A.11 link 92 with IP gateway 36 at step 214.

Access terminal 20 initiates a point-to-point (PPP) session with IP gateway 36 at step 218. In the link control protocol (LCP) phase of the PPP establishment, Password Authentication Protocol (PAP) and/or Challenge Handshake Authentication Protocol (CHAP) may be used to authenticate access terminal 20.

IP gateway 36 sends an access request to visited AAA server 58a at step 222, which relays the access request to home AAA server 58b. Home AAA server 58b authenticates access terminal 20 at step 226. Home AAA server 58b sends an access acceptance to visited AAA server 58a at step 230, which forwards the access acceptance to IP gateway 36.

The access acceptance may include authorization parameters inserted by home AAA server 58b and/or visited AAA server 58a. The parameters may describe resources assigned by servers 38. For example, home AAA server 58a may assign home bearer manager 44a for mobile IP service, and visited AAA server 58a may assign visited bearer manager 40a and visited policy server 44a. In one embodiment, the access request and access acceptance may conform to the Remote Authentication Dial In User Service (RADIUS) protocol.

IP gateway 36 informs access terminal 20 that the PPP session has been established at step 234. Access terminal 20 sends an IP address request to IP gateway 36 at step 238. The address request may be sent during the IP Control Protocol (IPCP) phase of the PPP establishment. IP gateway 36 sends a Proxy Mobile IP (PMIP) registration request to visited bearer manager 40a at step 242. The registration request may indicate that the care of address is IP gateway 36 and that the agent is visited bearer manager 40a, and may be protected by an MN-HA security association.

Visited bearer manager 40a authenticates the registration request and assigns a visited network address (V-NA) from a visited network address pool at step 244. Visited bearer manager 40a sends an authorization request that includes the visited network address to visited policy server 44a at step 248. Visited policy server 44a forwards the authorization request to home policy server 44b.

Home policy server 44b sends a policy request to services data manager 52 at step 252. The policy request requests the policy corresponding to access terminal 20. Services data manager 52 sends the requested policy to home policy server 44b in a policy reply at step 256. Home policy server 44b sends an authorization response to visited policy server 44a at step 260. The authorization response includes the policy. Visited policy server 44a may add its own policy before forwarding the authorization response to visited bearer manager 40b. In one embodiment, the authorization request and authorization response may conform to the Diameter protocol.

Visited bearer manager 40a sets up forwarding for visited network address through VBM-IPGW tunnel 88 at step 264. Visited bearer manager 40 may create a mobility binding entry for access terminal 20 to set up forwarding. Visited bearer manager 40a sends a PMIP registration reply to IP gateway 36 at step 268. The registration reply may include the visited network address as the home address, and may be protected by an MN-HA authentication extension.

IP gateway 36 sets up forwarding between the PPP session and the VBM-IPGW tunnel 88 at step 272. IP gateway 36 sends the visited network address to access terminal 20 in an PPP configuration message at step 276. Access terminal 20 obtains the visited network address at step 280. Access terminal 20 may use the visited network address to communicate packets along visited anchored path 82.

Modifications, additions, or omissions may be made to the method without departing from the scope of the invention. The method may include more, fewer, or other steps. Additionally, steps may be performed in any suitable order.

Figure 5:
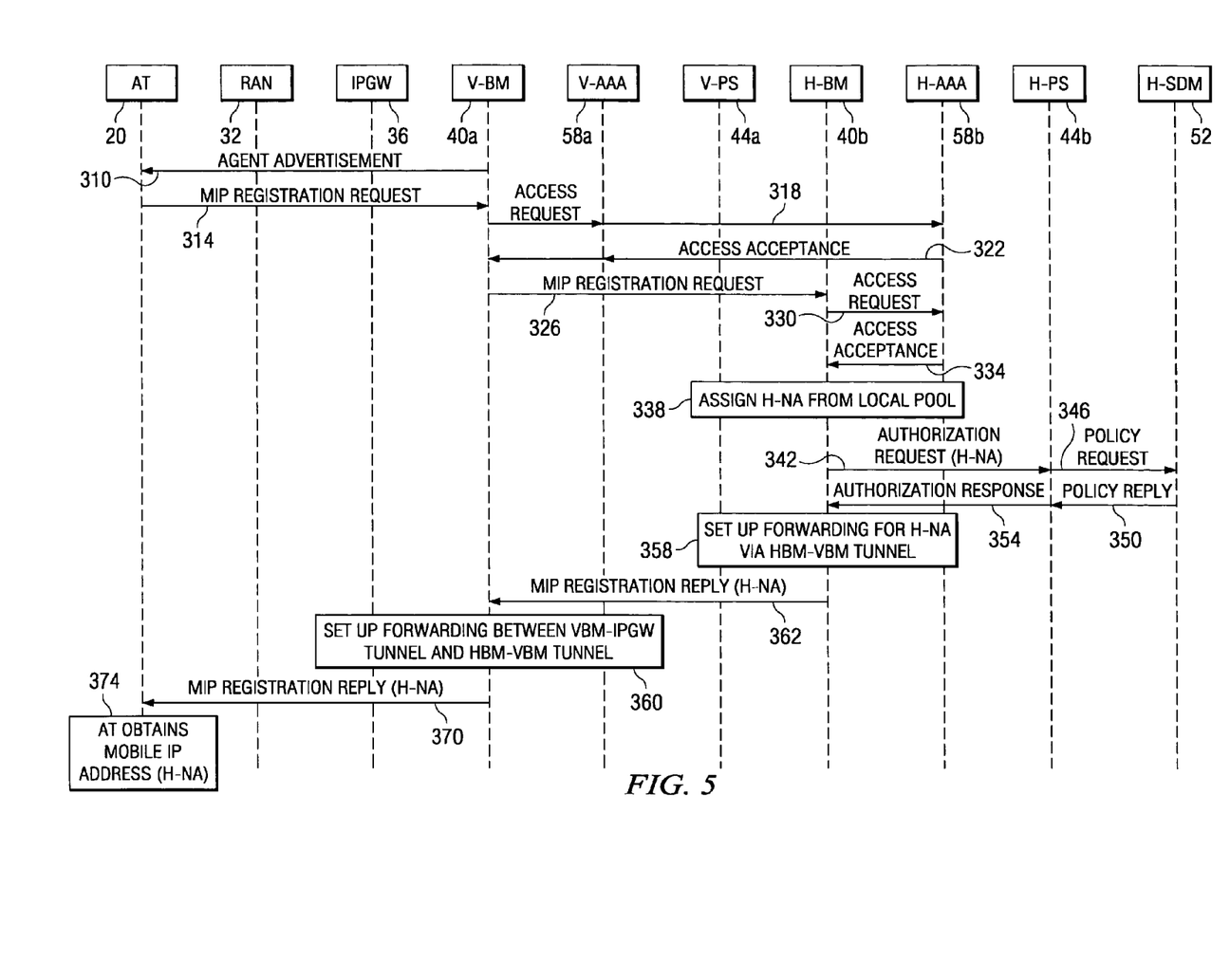
FIG. 5 illustrates one embodiment of a method for establishing a mobile Internet Protocol (IP) session that may be used by the system of FIG. 1.

FIG. 5 illustrates one embodiment of a method for establishing a mobile IP session that may be used by system 10 of FIG. 1. The method begins at step 310, where visited bearer manager 40a sends an agent advertisement to IP gateway 36, which forwards the agent advertisement to access terminal 20.

Access terminal 20 sends a mobile IP (MIP) registration request to visited bearer manager 40a at step 314. The message may include a mobile node-foreign agent (MN-FA) challenge extension, a mobile node-home agent (MN-HA) authentication extension, and a mobile node-AAA (MN-AAA) authentication extension.

Visited bearer manager 40a processes the registration request and maps the MN-FA challenge extension and MN-AAA authentication extension to an access request. Visited bearer manager 40a sends an access request to visited AAA server 58a at step 318, which forwards the access request to home AAA server 58b. Home AAA server 58b authenticates access terminal 20 and sends an access acceptance to visited AAA server 58a at step 322, which forwards the access acceptance to visited bearer manager 40a. The access acceptance may include authorization attributes from both the visited and home AAA servers 58.

Visited bearer manager 40a relays the registration request to home bearer manager 40b at step 326. In another embodiment, if access terminal 20 knows home bearer manager 40b, access terminal 20 may send the registration request directly to the home bearer manager 40b, which forwards the registration request to home AAA server 58b.

Home bearer manager 40b processes the registration request, and sends an access request to home AAA server 58b at step 330. Home AAA server 58b sends an access acceptance to home bearer manager 40b at step 334. The access acceptance may include authorization attributes for home agent service. Home bearer manager 40b assigns a home network address (H-NA) from a local address pool at step 338.

Home bearer manager 40b may authenticate the registration request according to the MN-HA security association, and then sends an authorization request to home policy server 44b at step 342. Home policy server 44b sends a policy request to services data manager 52 at step 346. The policy request requests the policy corresponding to access terminal 20. Services data manager 52 sends the requested policy in a policy reply at step 350. Home policy server 44b sends an authorization response with the policy to home bearer manager 40b at step 354. The authorization response includes the address for applications manager 56 assigned to access terminal 20 for SIP service.

Home bearer manager 40b sets up forwarding for home network address through HBM-VBM tunnel 86 at step 358. Home bearer manager 40b may create a mobility binding entry for access terminal 20 to create HBM-VBM tunnel 86. Home bearer manager 40b sends a registration reply to visited bearer manager 40a at step 362. The registration reply includes the assigned home network address.

Visited bearer manager 40a sets up forwarding between VBM-IPGW tunnel 88 and HBM-VBM tunnel 86 at step 360. Visited bearer manager 40a relays the mobile IP registration reply to access terminal 20 at step 370. The registration reply includes the home network address. Access terminal obtains the home network address as the mobile IP address at step 374. Access terminal 20 may use the home network address to communicate packets along home anchored path 80.

To re-register, access terminal 20 may send a re-registration request to visited bearer manager 40a, which forwards the request to home bearer manager 40b. The re-registration request may be a mobile IP registration request that includes the home network address and the visited network address. Home bearer manager 40b updates the mobility binding for access terminal 20. Home bearer manager 40b then sends a registration reply to visited bearer manager 40a, which updates the visitor entry for access terminal 20. Visited bearer manager 40b then sends the registration reply to access terminal 20, which updates its registration state.

To deregister, access terminal 20 sends a deregistration request to visited bearer manager 40a, which forwards the request to home bearer manager 40b. The deregistration request may comprise a registration request with a lifetime of zero. Home bearer manager 40b deletes the mobility binding for access terminal 20, and sends a registration reply to visited bearer manager 40b. Visited bearer manager 40b deletes the visitor entry for access terminal 20. Visited bearer manager 40b then sends a registration reply to access terminal 20, which deletes its registration state.

Modifications, additions, or omissions may be made to the method without departing from the scope of the invention. The method may include more, fewer, or other steps. Additionally, steps may be performed in any suitable order.

Certain embodiments of the invention may provide one or more technical advantages. A technical advantage of one embodiment may be that packets from an access terminal can be communicated along a home anchored path or a visited anchored path. The home anchored path includes a home bearer manager of the home network of the access terminal and may include a visited bearer manager of the visited network. The visited anchored path includes the visited bearer manager, but not the home bearer manager.

Another technical advantage of one embodiment may be that the access terminal can be provided with a home network address and a visited network address. The home network address may be used to communicate packets along the home anchored path, and the visited network address may be used to communicate packets along the visited anchored path.

Another technical advantage of one embodiment may be that a home policy server of the home network may provide policy rules to a visited policy server of the visited network. The policy rules may be used to enforce policies for packets sent along the visited anchored path.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method for communicating a plurality of packets along a bearer path, comprising:

wirelessly receiving a home network address at an access terminal while the access terminal is in a home network, the home network address corresponding to a home anchored bearer path anchored at the home network of the access terminal;

wirelessly receiving a visited network address at the access terminal while the access terminal is in a visited network, the visited network address corresponding to a visited anchored bearer path anchored at the visited network;

notifying, by the access terminal in the visited network, the home network of the visited network address, the home anchored bearer path comprising a bearer manager of the visited network in response to the notification of the visited network address;

receiving, by the access terminal, a home network policy from the visited network in response to notifying the home network of the visited network address;

determining, by the access terminal, to communicate a first set of packets on the home anchored bearer path and a second set of packets on the visited anchored bearer path in response to receiving the home network policy; and communicating, at the access terminal, in a session while the access terminal is in the visited network utilizing both the home network address and the visited network address, the first set of packets communicated on the home anchored bearer path and the second set of packets communicated on the visited anchored bearer path during the session.

2. The method of claim 1, wherein receiving the visited network address at the access terminal further comprises:
receiving the visited network address in a Dynamic Host Configuration Protocol (DHCP) response.

3. The method of claim 1, wherein receiving the visited network address at the access terminal further comprises:
receiving the visited network address during initiation of a Packet Data Protocol (PDP) context.

4. The method of claim 1, wherein communicating in a session utilizing both the home network address and the visited network address further comprises:
using the visited network address for transmitting media information according to an instruction stored at the access terminal.

5. The method of claim 1, wherein communicating in a session utilizing both the home network address and the visited network address further comprises:
using the home network address for transmitting signaling information.

6. An access terminal for communicating a plurality of packets along a bearer path, comprising:
at least one memory operable to:
store a home network address wirelessly received at the access terminal while the access terminal is in a home network, the home network address corresponding to a home anchored bearer path anchored at the home network of the access terminal; and
store a visited network address wirelessly received at the access terminal while the access terminal is in a visited network, the visited network address corresponding to a visited anchored bearer path anchored at the visited network; and
a processor coupled to the memory and operable to:
notify, by the access terminal in the visited network, the home network of the visited network address, the home anchored bearer path comprising a bearer manager of the visited network in response to the notification of the visited network address;
receive, by the access terminal, a home network policy from the visited network in response to notifying the home network of the visited network address;
determine, by the access terminal, to communicate a first set of packets on the home anchored bearer path and a second set of packets on the visited anchored bearer path in response to receiving the home network policy; and
communicate, at the access terminal, in a session while the access terminal is in the visited network utilizing both the home network address and the visited network address, the first set of packets communicated on the home anchored bearer path and the second set of packets communicated on the visited anchored bearer path during the session.

7. The access terminal of claim 6, wherein the visited network address is received in a Dynamic Host Configuration Protocol (DHCP) response.

8. The access terminal of claim 6, wherein the visited network address is received during initiation of a Packet Data Protocol (PDP) context.

9. The access terminal of claim 6, wherein communicating in a session utilizing both the home network address and the visited network address further comprises:
using the visited network address for transmitting media information according to an instruction stored at the access terminal.

10. The access terminal of claim 6, wherein communicating in a session utilizing both the home network address and the visited network address further comprises:
using the home network address for transmitting signaling information.

11. Logic for communicating a plurality of packets along a bearer path, the logic embodied in a non-transitory computer-readable storage medium and operable to:
wirelessly receive a home network address at an access terminal while the access terminal is in a home network, the home network address corresponding to a home anchored bearer path anchored at the home network of the access terminal;
wirelessly receive a visited network address at the access terminal while the access terminal is in a visited network, the visited network address corresponding to a visited anchored bearer path anchored at the visited network;
notify, by the access terminal in the visited network, the home network of the visited network address, the home anchored bearer path comprising a bearer manager of the visited network in response to the notification of the visited network address;
receive, by the access terminal, a home network policy from the visited network in response to notifying the home network of the visited network address;
determine, by the access terminal, to communicate a first set of packets on the home anchored bearer path and a second set of packets on the visited anchored bearer path in response to receiving the home network policy; and
communicate, at the access terminal, in a session while the access terminal is in the visited network utilizing both the home network address and the visited network address, the first set of packets communicated on the home anchored bearer path and the second set of packets communicated on the visited anchored bearer path during the session.

12. The logic of claim 11, further operable to receive the visited network address at the access terminal by:
receiving the visited network address in a Dynamic Host Configuration Protocol (DHCP) response.

13. The logic of claim 11, further operable to receive the visited network address at the access terminal by:
receiving the visited network address during initiation of a Packet Data Protocol (PDP) context.

14. The logic of claim 11, wherein communicating in a session utilizing both the home network address and the visited network address further comprises:
using the visited network address for transmitting media information according to an instruction stored at the access terminal.

15. The logic of claim 11, wherein communicating in a session utilizing both the home network address and the visited network address further comprises:
using the home network address for transmitting signaling information.

16. A system for communicating a plurality of packets along a bearer path, comprising:
means for wirelessly receiving a home network address at an access terminal while the access terminal is in a home network, the home network address corresponding to a home anchored bearer path anchored at the home network of the access terminal;

means for wirelessly receiving a visited network address at the access terminal while the access terminal is in a visited network, the visited network address corresponding to a visited anchored bearer path anchored at the visited network;

means for notifying, by the access terminal in the visited network, the home network of the visited network address, the home anchored bearer path comprising a bearer manager of the visited network in response to the notification of the visited network address;

means for receiving, by the access terminal, a home network policy from the visited network in response to notifying the home network of the visited network address;

means for determining, by the access terminal, to communicate a first set of packets on the home anchored bearer path and a second set of packets on the visited anchored bearer path in response to receiving the home network policy; and means for communicating, at the access terminal, in a session while the access terminal is in the visited network utilizing both the home network address and the visited network address, the first set of packets communicated on the home anchored bearer path and the second set of packets communicated on the visited anchored bearer path during the session.

17. A method for communicating a plurality of packets along a bearer path, comprising:

wirelessly receiving a home network address at an access terminal while the access terminal is in a home network, the home network address corresponding to a home anchored bearer path anchored at the home network of the access terminal;

wirelessly receiving a visited network address at the access terminal while the access terminal is in a visited network, the visited network address corresponding to a visited anchored bearer path anchored at the visited network, receiving the visited network address further comprising:

receiving the visited network address in a Dynamic Host Configuration Protocol (DHCP) response; or receiving the visited network address during initiation of a Packet Data Protocol (PDP) context;

notifying, by the access terminal in the visited network, the home network of the visited network address, the home anchored bearer path comprising a bearer manager of the visited network in response to the notification of the visited network address;

determining whether to use the home anchored bearer path, the visited anchored bearer path, or both by:

receiving, by the access terminal, a home network policy from the visited network in response to notifying the home network of the visited network address;

determining, by the access terminal, to communicate a first set of packets on the home anchored bearer path and a second set of packets on the visited anchored bearer path in response to receiving the home network policy; and communicating, at the access terminal, in a session while the access terminal is in the visited network utilizing both the home network address and the visited network address, the first set of packets communicated on the home anchored bearer path and the second set of packets communicated on the visited anchored bearer path during the session.

\* \* \* \* \*